Oct. 9, 1934.   S. C. HOARE ET AL   1,976,498
ELECTRICAL MEASURING INSTRUMENT
Filed July 21, 1933   2 Sheets-Sheet 2

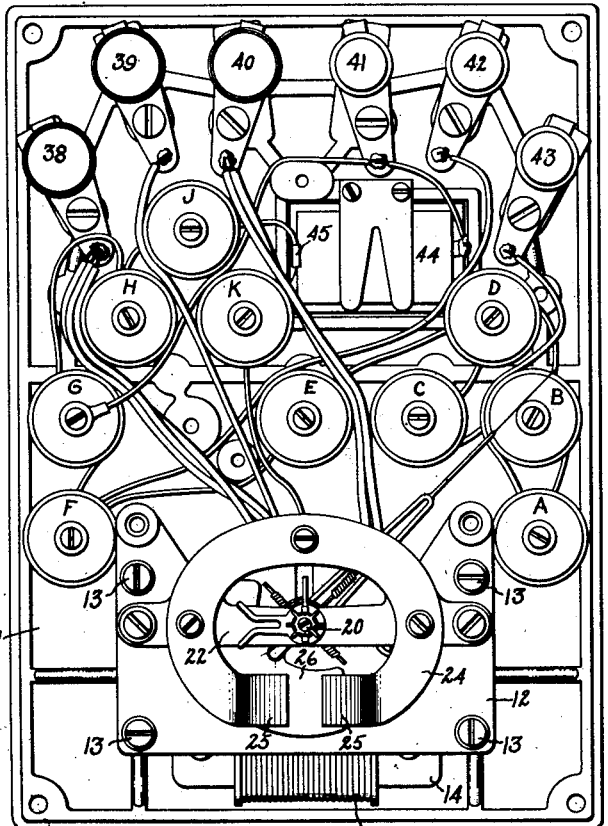
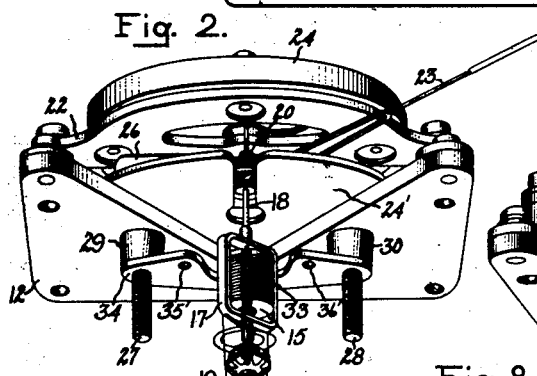
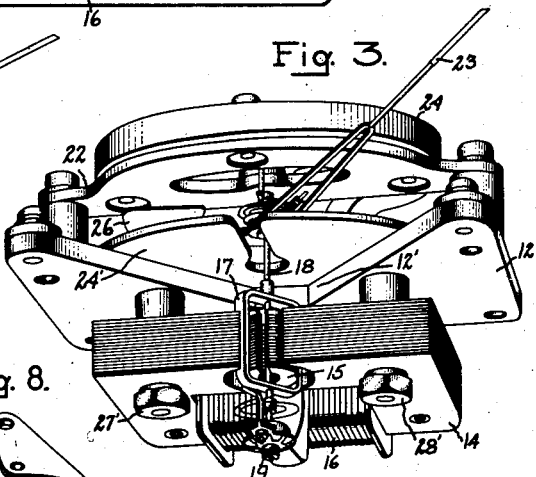
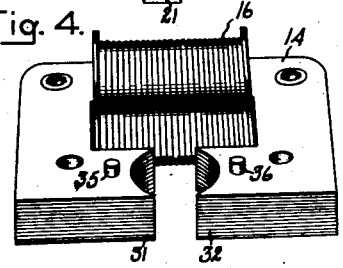

Inventors:
Stephen C. Hoare,
Benjamin H. Parker,
by Harry E. Dunham
Their Attorney.

Patented Oct. 9, 1934

1,976,498

UNITED STATES PATENT OFFICE

1,976,498

ELECTRICAL MEASURING INSTRUMENT

Stephen C. Hoare, Manchester, and Benjamin H. Parker, Lynn, Mass., assignors to General Electric Company, a corporation of New York Application July 21, 1933, Serial No. 681,524

6 Claims. (Cl. 171—95)

Our invention relates to electrical measuring instruments.

It is an object of our invention to provide a simple, reliable, sturdy, and easily assembled and disassembled construction for electrical instruments. It is a further object of our invention to provide an arrangement whereby the magnetic circuit of a dynamometer type of instrument may be composed of iron or other magnetic material to increase the sensitivity of the instrument and diminish the tendency for errors due to stray field. It is another object of our invention to provide a compensating arrangement for dynamometer type instruments employing iron or other magnetic material in a magnetic circuit. Other and further objects and advantages of the invention will become apparent as the description proceeds.

In the design of dynamometer type instruments having iron magnetic circuits, difficulties have heretofore been experienced in finding a construction which will permit easy assembly of the instrument, and in connection with alternating-current circuit measurements electrical difficulties have also been introduced by the angle of advance of the current in the stationary winding produced by the hysteresis in the iron magnetic circuit. In accordance with our invention in its preferred form, the movable element and the field structure are independently mounted on a base plate, and the electrical circuits are compensated to overcome the effect of hysteresis.

Figure 5:
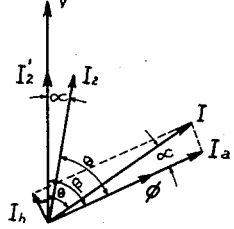
Figure 6:
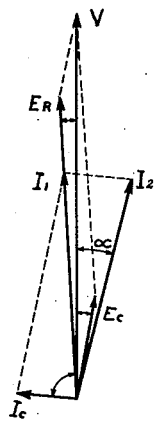

The features of our invention which we believe to be novel and patentable will be pointed out in the claims appended hereto. Our invention itself, however, will be best understood by referring to the following description taken in connection with the accompanying drawings in which Fig. 1 is a plan view with the scale plate and cover removed of one embodiment of our invention; Figs. 2 and 3 are perspective views showing the instrument unit removed from the case; Fig. 4 is a perspective view of the field structure of the instrument illustrated in the foregoing views; Fig. 5 is a vector diagram explaining the necessity for compensating the instrument; Fig. 6 is a vector diagram, and Fig. 7 a schematic circuit diagram explaining and illustrating the method of compensation, and Fig. 8 is a perspective view of the core of the instrument illustrated in Fig. 1.

Referring now more in detail to the drawings, in which like reference characters refer to like parts throughout, the casing of the instrument consists of a base 11 and a cover portion which is not shown for the sake of clarity. The scale plate has also been omitted from the drawings in order that the construction of the instrument may be shown more clearly. The instrument unit itself is supported by a plate 12 which is attached to the base 11 of the casing by means of screws 13 engaging vertical posts, not visible, formed in the base 11.

The field structure of the instrument consists of a yoke 14, preferably laminated, and a slotted core 15. The yoke 14 and core 15 are preferably composed of a relatively high permeability magnetic material having a relatively low loss. Any suitable material may be employed, but we have found that satisfactory results may be obtained by utilizing an alloy, for example, containing about 78% nickel and the remainder iron, as described in U. S. Patent 1,586,884 to Elmen. To obtain the full advantage of such a material it is preferably annealed and precautions are taken to avoid bending any of the laminations in assembly as this tends to overcome the effect of annealing and to increase the hardness and the losses. The use of high permeability material reduces errors due to waveform, hysteresis and to low power-factor of load.

The movable element of the instrument comprises a current-conducting coil 17 carried by a shaft 18 supported in bearings 19 and 20, supported respectively by means of a bracket 21 and a crosspiece 22 attached to the supporting plate 12, which plate may, if desired, be recessed to form a wide notch 12' providing ample clearance for the movable coil 17. The shaft 18 also carries a pointer 23 cooperating with a scale, not shown.

If desired the instrument may be provided with a magnetic damping arrangement comprising a permanent magnet 24 having downwardly extending pole portions 25 cooperating with a magnetic vane 26 carried by the shaft 18 of the movable element. It will be understood that a soft iron bridging bar, not visible in the drawings, is preferably provided under the pole portions 25 of the magnet 24 on the opposite side of the magnetic vane 26 from the pole portions 25 to increase the strength of the flux cut by the vane 26 as the movable element deflects. A magnetic shield 24' may also be employed to prevent interaction between the damping magnet 24, and the windings of the instrument.

In order that the field structure may be removed from the instrument without removing the movable element or disturbing its adjustment, the laminated yoke 14 is preferably secured to the supporting plate 12 by means of a pair of stud bolts 27 and 28 secured in bosses 29 and 30 in the plate 12. The core 15 is supported between the concave pole faces 31 and 32 of the laminated yoke 14 to form a pair of air gaps for the movable coil 17 having substantially the form of segments of an annulus. The core 15 is preferably also laminated and is provided with a slot 33 which is parallel to its axis and extends from the outer edge of the core 15 to a point slightly beyond the center of the core 15 to permit the use of a shaft running through the movable coil 17 and extending from one bearing 19 to the other bearing 20. The core 15 is supported by means of non-magnetic rivets joining the laminations to each other and to a projection 34' on a cross strip 34, of non-magnetic material, which is also supported between the studs 27 and 28.

The laminated yoke 14 may be removed from the instrument without disturbing the movable element by unscrewing the nuts 27' and 28' from studs 27 and 28. To assure accurate lining up of the pole faces 31 and 32 with respect to the cylindrical surface of the laminated core 15 and with respect to the position of the movable coil 17, pins 35 and 36 attached to the laminated yoke 14 are provided and cooperate with hole 35' and 36' in the cross strip 34. This construction permits mounting and adjusting the movable element before the field structure is secured in place, thereby facilitating the assembly. The construction also permits testing the movable element before completely assembling the instrument.

Although our invention is obviously not limited to wattmeters, we shall for the sake of illustration describe its use in connection with an instrument arranged as a wattmeter.

Conductors are led from the ends and suitable taps of the stationary coil 16 to current terminals 38, 39 and 40 to provide two current ranges in a manner well understood in the art. This arrangement does not form a part of our invention and therefore is not described.

Likewise a plurality of potential terminals 41, 42, and 43 are provided in order that the instrument may be used with two ranges of voltages. In the specific construction illustrated, the potential terminal 41 is a common terminal for either voltage range and the terminals 42 and 43 serve as alternative terminals for two voltage ranges, terminal 43 being used for the higher voltage range. The resistance spools A, B, C, D, E, F, G, H, J and K are so connected that all of the resistance spools are in series with the movable coil 17, which serves as a potential winding, for the higher voltage range; but only the spools G, H, J, and K are in circuit for the lower voltage range.

In dynamometer instruments having air cores the magnetic fluxes produced by the currents flowing in the windings obviously are in phase with the currents so that the torque between the cooperating windings truly represents the power of the circuit if the two windings carry currents proportionate to current and voltage respectively of an electrical circuit. When cores of iron or magnetic material are used, however, losses occur in the iron as a result of hysteresis and the flux $\phi$ due to the current in the stationary winding 16 is in phase with a current $I_a$, Fig. 5, which may be called the apparent current and is the vector difference between the actual current I of winding 16 and the component $I_h$ required to supply the hysteresis loss. From Fig. 5 it will be seen that the current $I_a$ which produces the flux cooperating with the current $I_2$ in the movable coil 17 lags an angle $\alpha$ behind the true current I so that an error will be introduced into the readings of the instrument since the torque acting upon a current-conducting coil in a magnetic field depends not merely on the magnitudes of the current and flux, but also on their phase relationship. The current $I_2'$ which would normally flow in the movable coil 17, since it would flow in a highly resistive circuit, including the resistance of all the spools A to K would be substantially in phase with the voltage V applied to the voltage terminals 41 and 43. For convenience the operation is discussed for the higher voltage range connection.

Figure 7:
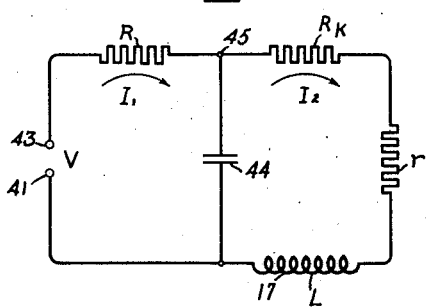

We have found that a convenient way of compensating the instrument for the phase lag of the apparent current $I_a$ in the winding 16 is to cause the current $I_2$ flowing in the movable coil 17 to lag the same angle $\alpha$ beyond the applied voltage V. This may be accomplished by connecting a condenser 44 between the voltage terminal 41 and the common terminal 45 of resistance spools J and K. In Fig. 7 the inductance L represents the inductance of the movable coil 17, resistor $r$ represents the resistance inherent in the coil 17, resistor $R_K$ represents the resistance of the spool K and the resistor R represents the resistance of the remaining resistance spools in the potential circuit.

The currents and voltages existing in the circuit represented in Fig. 7 are shown graphically in the vector diagram, Fig. 6. The voltage V at the potential terminals 41 and 43 is the vector sum of the potential drop $E_R$ in the resistor R and the potential drop $E_C$ in the condenser 44. The potential $E_C$ will obviously lag behind the potential drop $E_R$, and the vector representing the applied voltage V will lie between vectors $E_R$ and $E_C$. The current $I_1$ flowing through potential terminals 41 and 43 and through the resistor R obviously will be in phase with the potential drop $E_R$. The current $I_C$ flowing in the condenser 44 will lead the condenser drop $E_C$ substantially 90°. Since the current $I_1$ is the vector sum of the current $I_C$ and the current $I_2$ flowing in the movable coil 17, the current $I_2$ will obviously lag behind the current $I_1$ and also behind the voltage V. The angle of lag of the current $I_2$ behind voltage V will be $\alpha$ since the constants of the circuit have been so chosen as to obtain this angle of lag.

It will be seen from Fig. 5 that the angle $\theta$ between the current $I_2$ representing the voltage of the circuit to be measured and the flux $\phi$ representing the current flowing in the circuit is the same angle as the power factor angle $\theta$ between the voltage V and the current I which actually flows in the circuit to be measured. Consequently, the effect of hysteresis is overcome and the power in an alternating-current electrical circuit is accurately indicated, although the magnetic circuit of the instrument contains iron or other magnetic material.

In accordance with the provisions of the patent statutes, we have described the principle of operation of our invention, together with the apparatus which we now consider to represent the best embodiment thereof, but we desire to have it understood that the apparatus shown is only illustrative and that the invention may be carried out by other means.

What we claim as new and desire to secure by Letters Patent in the United States is:

1. A dynamometer type electrical measuring instrument comprising a laminated yoke of relatively permeable magnetic material having concave pole faces opposite each other, a substantially cylindrical laminated core of relatively permeable material supported between said pole faces to form air gaps therebetween having substantially the shape of segments of an annulus and having a slot therein extending from the edge thereof and including the axis of said core, a stationary current-conducting winding on said yoke, a movable current-conducting coil, a shaft at the inner side of the slot in said core substantially coaxial therewith and supporting said coil, whereby said movable coil is acted upon by a torque dependent upon both the current in said stationary winding and the current in said movable coil.

2. In an electrical measuring instrument, the combination of a supporting plate having a notch therein, a pair of studs adapted to be attached to said plate perpendicular thereto and on opposite sides of said notch, a core-supporting strip supported by said studs, a magnetic yoke also supported by said studs and having pole portions extending towards each other and overhanging said notch, a substantially cylindrical core attached to said supporting strip between the pole portions of said magnetic yoke and having a slot therein, an air gap being formed between said slotted core and the pole portions of said magnetic yoke, a pair of brackets attached to said supporting plate and bearings carried thereby on opposite sides of said supporting plate, a shaft supported between said bearings within said slot substantially coaxial with said core and a movable coil carried by said shaft and surrounding said core, thereby permitting said magnetic yoke to be removed from said base plate without removing said movable element.

3. In an electrical measuring instrument, the combination of a supporting plate having a notch therein, a magnetic yoke having pole faces opposite each other supported upon said supporting plate with said pole faces overhanging the notch in said plate, a magnetic core supported between the pole faces of said yoke, an air gap being formed between said slotted core and the pole faces of said magnetic yoke, mounting means on opposite sides of said supporting plate and attached thereto, and a current-conducting coil rotatably mounted in said mounting means between the pole faces of said magnetic yoke, surrounding said magnetic core and situated opposite the notch in said supporting plate, thereby permitting said magnetic yoke to be removed from said base plate without removing said movable element.

4. In an electrical measuring instrument, the combination of a supporting plate having a notch therein, a magnetic yoke supported on one side of said supporting plate and having pole faces opposite each other and overhanging the notch in said supporting plate, a core composed of magnetic material supported between the pole faces of said yoke, a current-conducting coil rotatably mounted between said pole faces and surrounding said core, a damping magnet supported by said supporting plate on the opposite side from said magnetic yoke, and a damping vane cooperating with said damping magnet and mechanically attached to said rotatable coil, thereby permitting said damping magnet and said magnetic yoke each to be removed from said base plate without removing said movable element.

5. In an electrical measuring instrument of the dynamometer type having a magnetic yoke of relatively permeable magnetic material magnetized by a stationary current-conducting winding connected to an electrical circuit to be measured and a movable current-conducting coil also connected to an electrical circuit to be measured and cooperating with said yoke, a system for compensating said instrument for phase errors resulting from hysteresis in said magnetic material, comprising a pair of resistors connected in series with said movable coil and a condenser shunting the portion of said circuit formed by said movable coil and one of said resistors in series, thereby retarding the phase relationship of the current flowing in said movable coil alone with respect to the total current flowing in the circuit to which said movable coil is connected and compensating for the phase lag between the component of current producing the flux acting in said magnetic yoke and the actual current flowing in said stationary winding.

6. A dynamometer type electrical measuring instrument for obtaining a combined response to currents in two electrical circuits comprising a magnetic yoke having pole faces opposite each other, a movable current-conducting coil connected to one of said circuits and cooperating with said yoke and a stationary current-conducting coil in inductive relation with said yoke and connected in the other of said circuits, a pair of resistors connected in series with said movable coil, and a condenser shunting a portion of the circuit formed by said coil and one of said resistors in series, thereby retarding the phase relationship of the current flowing in said movable coil with respect to the current flowing in the circuit to which said movable coil is connected and compensating for the hysteretic angle of advance of the current flowing in said stationary coil with respect to the flux in said magnetic yoke.

STEPHEN C. HOARE.
BENJAMIN H. PARKER.